United States Patent [19]

Sugimura

[11] Patent Number: 5,027,859
[45] Date of Patent: Jul. 2, 1991

[54] APPARATUS FOR SUPPORTING DIAPHRAGM OF ACCUMULATOR

[76] Inventor: Nobuyuki Sugimura, 415, Nishikubo, Shimizu-shi, Shizuoka-ken, Japan

[21] Appl. No.: 399,820

[22] Filed: Aug. 29, 1989

[30] Foreign Application Priority Data

Sep. 3, 1988 [JP] Japan .................. 63-116257[U]

[51] Int. Cl.⁵ .............................................. F16L 55/04
[52] U.S. Cl. ...................................... 138/30; 220/85 B
[58] Field of Search ............................ 138/26, 30, 31; 220/85 B; 417/540

[56] References Cited

U.S. PATENT DOCUMENTS

| Re. 23,199 | 2/1950 | Baker | 138/114 |
| 3,148,706 | 9/1964 | Mercier | 138/30 |
| 3,788,358 | 1/1974 | Taki | 138/30 |
| 3,792,721 | 2/1974 | Zahid | 138/30 |
| 4,793,381 | 12/1988 | Sugimura | 138/30 |

Primary Examiner—James E. Bryant, III
Attorney, Agent, or Firm—Wood, Phillips, Mason, Recktenwald & VanSanten

[57] ABSTRACT

An apparatus for supporting a diaphragm of an accumulator comprises a support ring which has a sectional form with a circular arc-shaped inner edge and a linear outer edge and which has an elastic layer provided on the side of the outer edge, the support ring being fitted into a groove provided in a flange of the diaphragm and inserted into a container body until it is stopped by a stage portion thereof so that the gap between the support ring and the container body is sealed by the elastic layer.

6 Claims, 4 Drawing Sheets

APPARATUS FOR SUPPORTING DIAPHRAGM OF ACCUMULATOR

BACKGROUND OF THE INVENTION

The present invention relates to an accumulator used for storing a liquid under pressure and absorbing pulsation and other purposes, and particularly to an apparatus for supporting the diaphragm of an accumulator which is capable of preventing any damage to the outer periphery of a flange for fixing the diaphragm.

When a diaphragm is supported by the container body of an accumulator, a support ring having an inner edge in the form of a circular arc and a linear outer edge is generally fitted into a U-shaped groove provided in the outer periphery of the flange, and the support ring and the diaphragm are together fitted into the body of the container so that the outer edge of the support ring is engaged with a step portion of the container body (refer to Japanese Utility Model Laid-Open No. 164602/1988 and U.S. Pat. No. 4793381).

A conventional apparatus for supporting the diaphragm of an accumulator comprises a support ring 13 which is formed by bending a sheet metal or machining a round slice of a pipe into the form shown in FIG. 6. However, since the support ring 13 is formed so as to have a diameter which is smaller than that of a container body 14 by a margin which allows engagement therewith, a gap 15 is produced between the container body 14 and the outer periphery of the support ring 13 when the support ring is fitted into the container body 14, as shown the same drawing. An outer peripheral portion 17a of the flange 17 of a diaphragm 16 is placed close above the gap 15 and enters the gap 15 during pressurization and returns during pressure reduction. There is thus a problem in that, if these actions are repeated, the outer peripheral portion 17a of the flange 17 is flawed, and the flaw thus produced is gradually increased by repetition of the pressing and pressure reduction in the accumulator, finally leading to damage of the outer peripheral portion 17a of the flange.

SUMMARY OF THE INVENTION

In view of the above-mentioned problem, it is an object of the present invention to prevent any damage to the outer peripheral portion of the flange.

In order to achieve the object of the present invention, a support ring which has a sectional form with a circular arc-formed inner edge and a linear outer edge and an elastic layer provided at the outer edge is fitted into a groove provided in a flange of the diaphragm, and the ring and the flange are inserted into the container body until they are stopped by a step portion thereof so that the gap between the support ring and the container body is sealed by the elastic member.

DESCRIPTION OF THE PREFERRED EMBODIMENT

Figure 1:
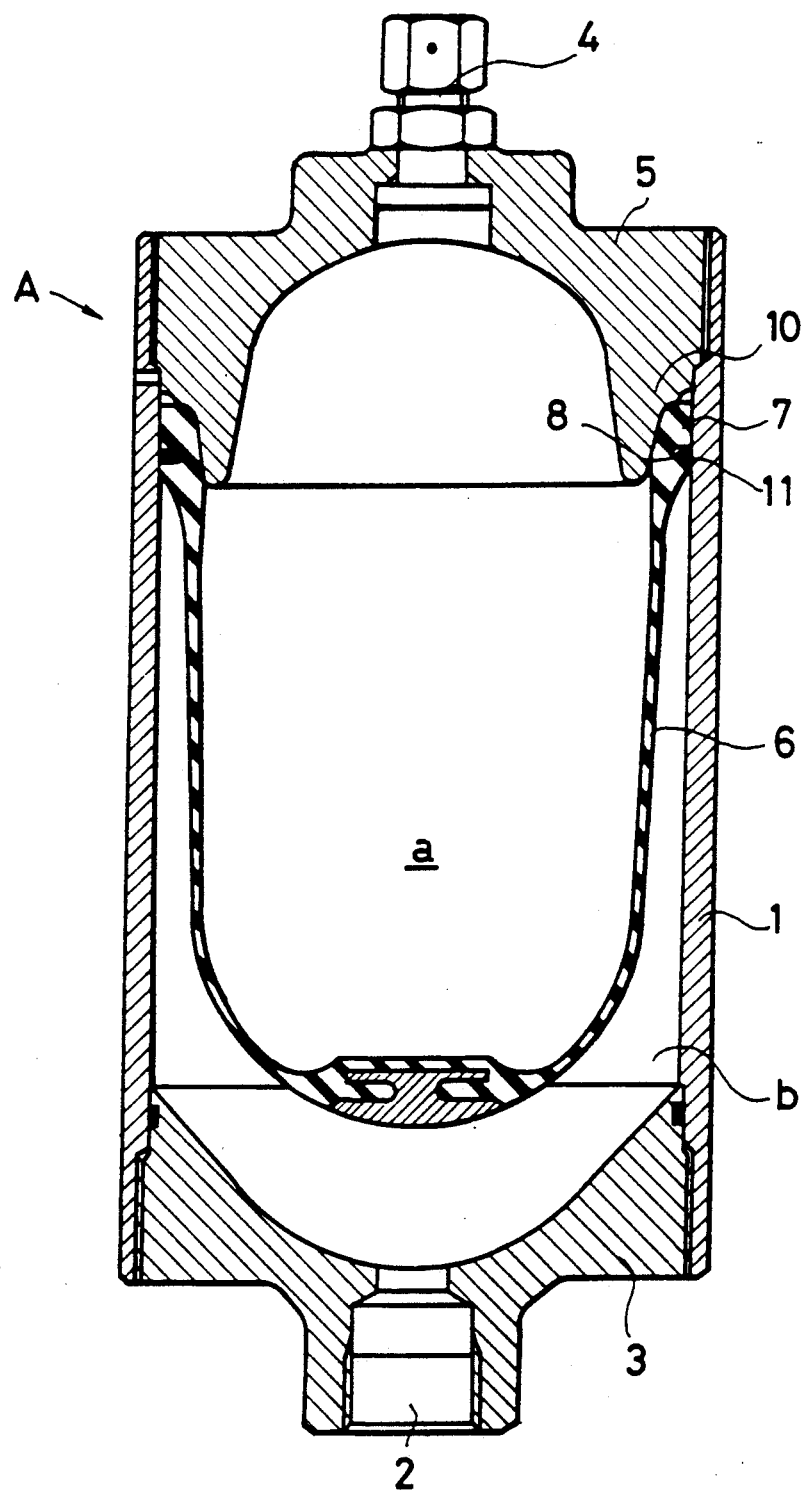
FIG. 1 is a longitudinal sectional front view of an an embodiment of an accumulator in which an apparatus in accordance with the present invention is employed.

In FIG. 1, reference numeral 1 denotes a cylindrical container body in an accumulator A, a bottom body 3 provided with a liquid inlet/outlet port 2 being screwed into the lower end of the container body, a cover body 5 provided with a gas sealing valve 4 being detachably screwed into the upper end thereof.

Figure 2:
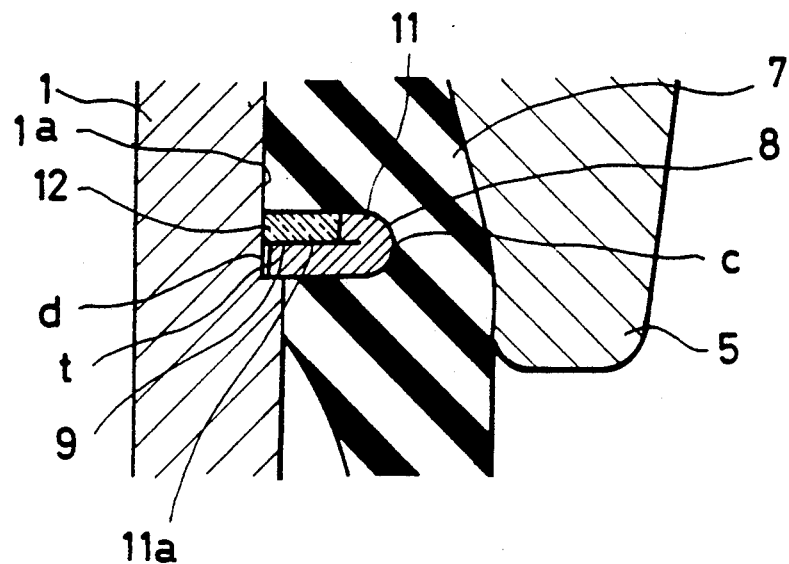
FIG. 2 is a partially sectional view of an example of a support ring of the apparatus of the present invention.
Figure 3:
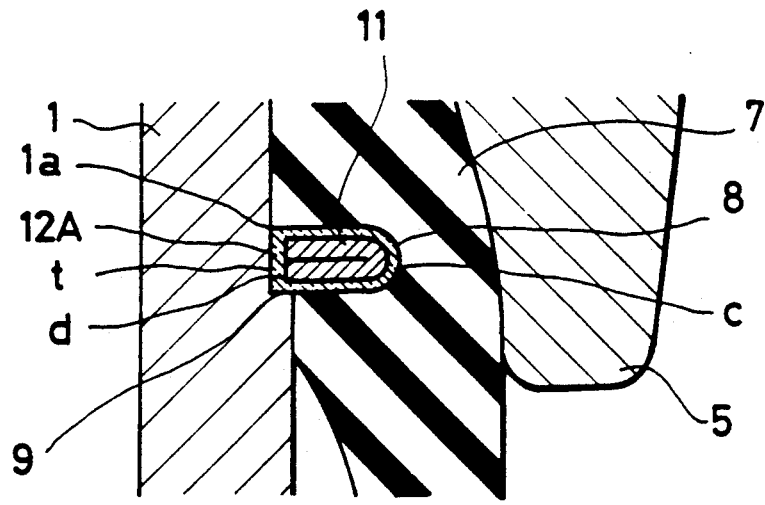
FIG. 3 is a partially sectional view of another example of a support ring of the same apparatus.

Reference numeral 6 denotes a diaphragm which is received in the container body 1 for the purpose of dividing the interior thereof into a gas chamber a and a liquid chamber b and which is made of natural or synthetic rubber. A mounting flange 7 is provided around the upper end of the diaphragm 6, and a groove 8 into which a support ring 11 is fitted is formed in a lower portion of the flange 7 on the outer side thereof In FIGS. 2 and 3, reference numeral 11 denotes the support ring which is formed by outwardly bending a doughnut-shaped sheet metal at the center of the width thereof or by machining a round slice of a pipe to form the shape shown in FIGS. 2 and 3 which has an inner edge c in the form of a circular arc and a linear outer edge d, as disclosed in the specifications of Japanese Utility Model Laid-Open No. 164602/1988 and U.S. Pat. No. 4793381. A notch portion 11a is formed by cutting off an upper half of the support ring in the external periphery of the outer edge d, as shown in FIG. 2. An elastic layer 12 made of an appropriate elastic material such as rubber, synthetic resin or the like is fitted in the notch portion 11a and fixed therein by means of an adhesive or melt-bonding so that it is not separated. Alternatively, as shown in FIG. 3, the whole of the support ring 11 is covered with the same elastic material 12A as that described above to form an elastic layer 12A which is not separated.

Figure 4:
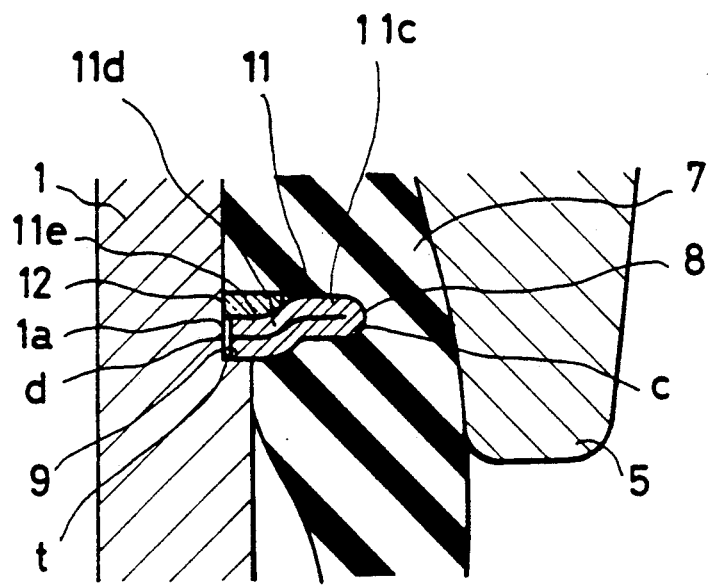
FIG. 4 is a partially sectional view of a modification of the example shown in FIG. 2.

FIG. 4 shows a modification of the support ring shown in FIG. 2. In the modification, a support ring has a cross-sectional form with a stage comprising an upper stage portion 11c in the inner half of the ring and a lower stage portion 11d in the outer half thereof, an elastic layer 12 being formed on the upper surface 11e of the lower outer half, i.e, the lower stage portion 11d.

Figure 5:
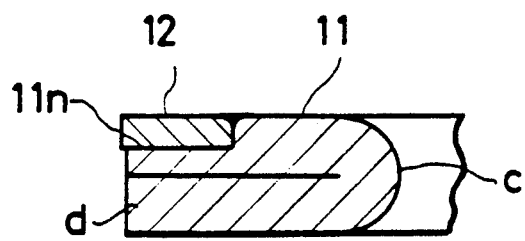
FIG. 5 is an enlarged sectional view of a principal portion of another embodiment.
Figure 6:
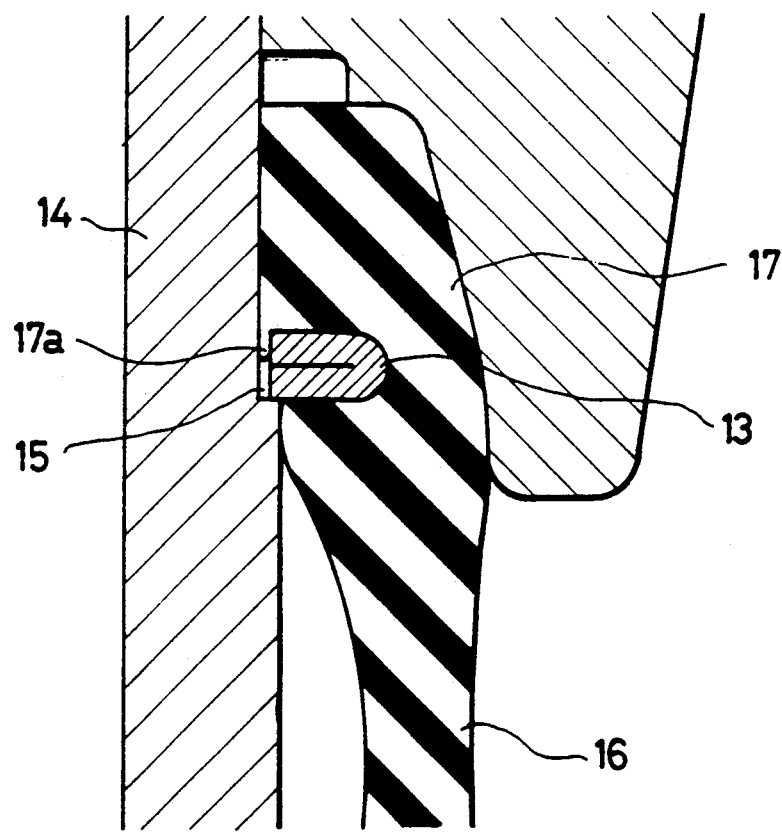
FIG. 6 is a partially sectional view of a conventional support ring.

A groove portion 11n (FIG. 5) may be formed by plastically deforming the upper half of the support ring on the outside thereof in place of the notch portion 11a formed by cutting off the upper half of the support ring, as shown in FIG. 2, so that the elastic layer 12 is fitted into the groove portion 11n and fixed therein.

The diaphragm 6 is inserted into the container body 1 from the opening thereof in such a manner that the inner edge c of the support ring 11 is fitted in the groove 8 of the flange 7, and the elastic layer 12 or 12A provided at the outer edge d is caused to face the inner wall 1a of the container body 1. The elastic layer 12 or 12A of the support ring 11 is consequently compressed by the container body 1 so as to adhere to the inner wall 1a of the container body 1. The gap t between the container body 1 and the support ring 11 is therefore sealed, and the support ring 11 is stopped by a stage portion 9 formed in an upper portion of the inner wall 1a. In this state, the cover body 5 is screwed into the opening of the container body, and the flange 7 of the diaphragm 6 is pressed by a hook-shaped pressure edge 10, which is inserted into the opening of diaphragm 6, so that the flange 7 is supported by the support ring 11, the inner wall 1a of the container body 1 and the hook-shaped pressure edge 10 of the cover body 5 in the four directions. The interior of the container body 1 is thus maintained at a completely airtight state, and the diaphragm 6 is not separated owing to the application of high pressure.

The elastic layer 12 or 12A of the support ring 11 is deformed in such a manner that it expands as the pressure in the longitudinal direction increases, resulting in an increase in the force sealing the gap t. There is thus no occurrence of a phenomenon in that the flange 7 of the diaphragm 6 enters the gap t, and the damage of the external peripheral portion of the flange 7 caused by the phenomenon can be completely prevented.

What is claimed is:

1. In an accumulator having an inner portion defined by an inner wall, said inner wall including a stage portion formed therein, a diaphragm dividing said accumulator inner portion into a first chamber and a second chamber, said diaphragm having a flange, said diaphragm flange having a groove, the improvement comprising a support ring fitted into said diaphragm flange groove and engaging said accumulator stage portion to support said diaphragm, said support ring having a cross-sectional form with an inner side, an outer side, a lower part and an upper part, a circular arc-shaped edge on the inner side of the support ring and a linear edge on the outer side of the support ring, said support ring further having a notch portion at the outer side of the upper part thereof; and an elastic layer formed separately from the diaphragm provided in the notch portion to project outwardly beyond the outer side to directly engage the inner wall and thereby prevent the formation of any gap beneath said support ring and said accumulator inner wall.

2. The improvement of claim 1, wherein said notch portion is formed by cutting off the upper half of said support ring in the outer side thereof.

3. A diaphragm supporting apparatus as recited in claim 1, wherein said support ring has substantially parallel upper and lower legs, said support ring further having said notched portion formed in said upper leg wherein said elastic layer is provided.

4. A bladder support apparatus as recited in claim 1 wherein said support ring comprises an upper stage portion and a lower stage portion, said lower stage portion having an upper surface on which said elastic layer is provided.

5. A diaphragm support apparatus as recited in claim 1 wherein said notched portion is formed by plastically deforming a portion of said support ring adjacent the outer edge thereof.

6. A diaphragm support apparatus as recited in claim 5 wherein said support ring includes substantially parallel upper and lower legs and said groove portion is located in one of said legs.

* * * * *